H. KÜNTZLER.
CLUTCH MECHANISM.
APPLICATION FILED AUG. 7, 1911.
1,151,803.
Patented Aug. 31, 1915.
3 SHEETS—SHEET 1.
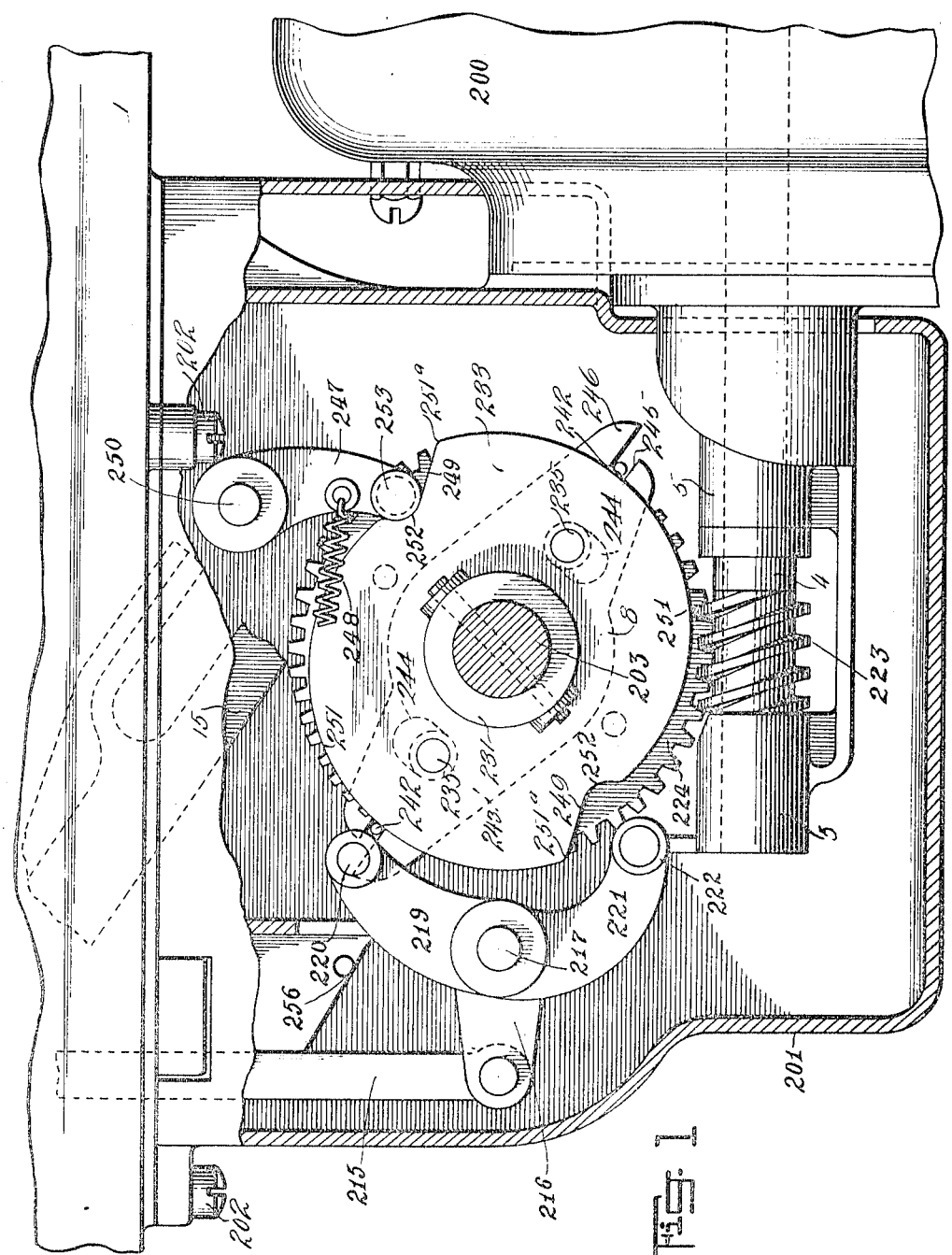
WITNESSES
INVENTOR
Henry Küntzler
BY
ATTORNEY

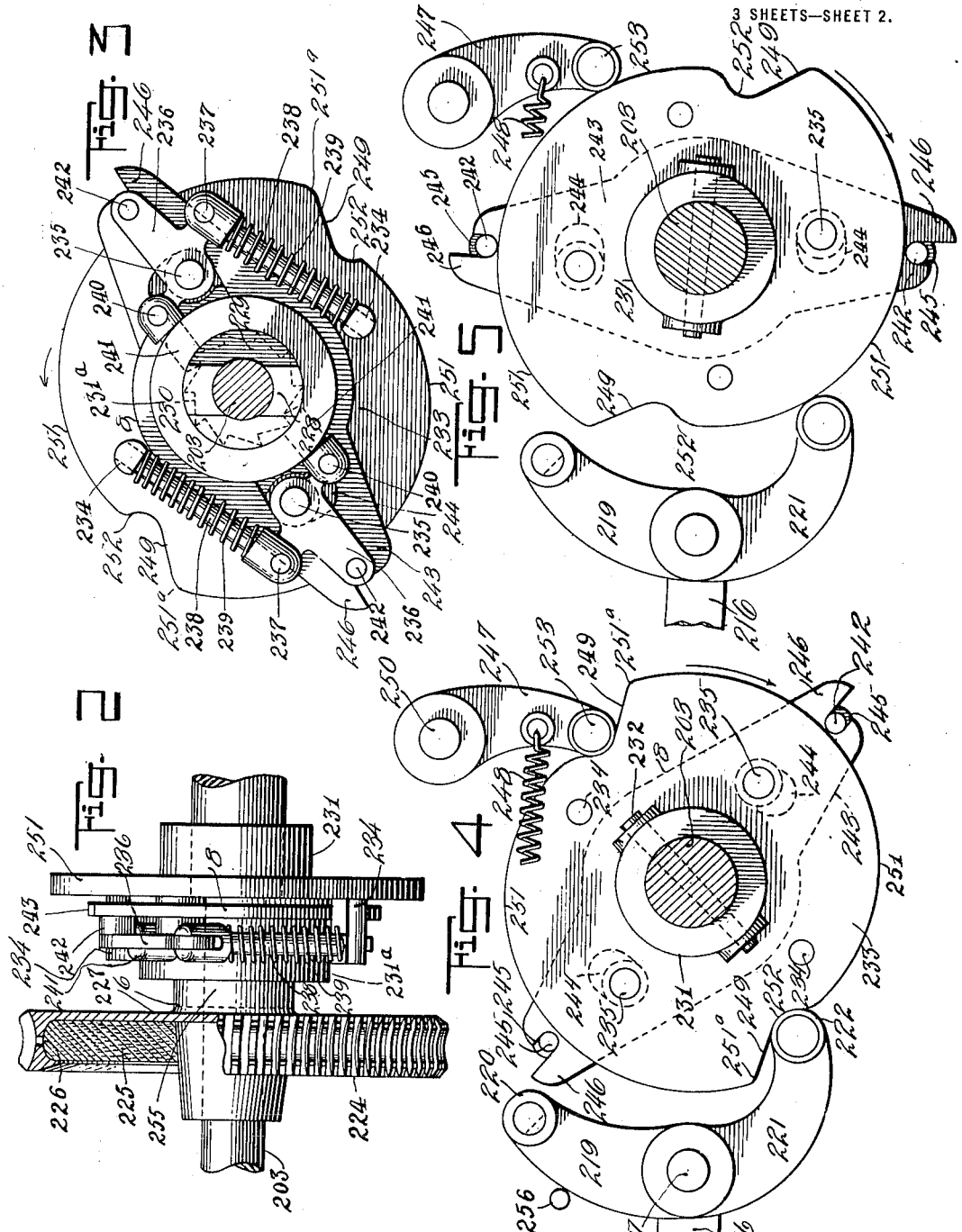

UNITED STATES PATENT OFFICE.

HENRY KÜNTZLER, OF WYOMING PENNSYLVANIA, ASSIGNOR TO ADDER MACHINE COMPANY.

CLUTCH MECHANISM.

1,151,803.   Specification of Letters Patent.   Patented Aug. 31, 1915.

Application filed August 7, 1911. Serial No. 642,894.

*To all whom it may concern:*

Be it known that I, HENRY KÜNTZLER, a citizen of the United States, residing at Wyoming, Luzerne county, Pennsylvania, have invented a new and useful Clutch Mechanism, of which the following is a specification.

This invention relates to an improvement in clutch mechanisms, one object being to provide a more speedy and powerful device wherein the disengagement of the clutch parts is facilitated, and the sound of their engagement materially reduced.

A further object is to provide a compact, well balanced, easily running clutch which may be readily manufactured, assembled and disassembled.

In the drawings, Figure 1 is a side view of one embodiment of the invention applied to the well-known Wales adding or calculating machine, the usual casing or bonnet being partly broken away. Fig. 2 is an edge view, partly in section, of the clutch mechanism alone. Fig. 3 is a side view of the carrier with the parts assembled thereon. Fig. 4 is a view of the clutch mechanism, showing the side opposite that disclosed in Fig. 3, and illustrating the positions of the parts when the detent is tripped. Fig. 5 is a similar view, showing the clutch partially rotated, the detent being restored to effective position. Fig. 6 is a side view, illustrating a detent-tripping mechanism in use on the Wales adding or calculating machine, only such parts of the machine being shown as intimately coöperate with the clutch. Fig. 7 is a detail perspective of one form of recessed clutch member or ratchet. Fig. 8 is a sectional view through the clutch mechanism.

Although the invention is illustrated in connection with a Wales adding or calculating machine, it may obviously be applied to various other mechanisms.

In adding machines of the key-set type, the registering, or printing mechanisms, or both, are commonly operated by a main shaft which is partially rotated in one direction and then released. Upon the release of the main shaft, a spring returns the parts to their normal positions. Referring to Fig. 6, the base plate 1 of such adding machine supports side frames 10, (one only of which is shown), in which is journaled a main shaft 11. A crank 2 on said shaft engages a slotted arm 3 (only part of which is shown) to effect an operation of the registering mechanism (not shown). A second crank 13 on the shaft 11 effects the operation of the printing mechanism through a link 14.

The main shaft may be operated by a motor 200, the casing or bonnet 201 of which is secured to the under side of the base plate by bolts 202. Said motor drives a worm shaft 4 (Fig. 1) journaled in suitable bearings 5 within the casing, and having a worm 223 thereon in mesh with a worm gear 224, preferably loosely mounted on a drive shaft 203, extending transversely relatively to the worm shaft and journaled in the sides of the casing or bonnet. When the machine is in use, the motor runs continuously, thereby turning the worm gear continuously. Said drive shaft may have a double crank or cross-arm 204, (Fig. 6,) fixed thereto, each arm of which carries a wrist 205, adapted to strike the driving toe 206 of a driving rack 15, to move said rack rectilinearly in one direction throughout substantially one half a revolution of the shaft. Teeth on the rack 15 mesh with a segmental gear 12 fast on the main shaft 11 to partially rotate the latter and thereby effect the operation of the registering and recording mechanisms.

At the end of the driving stroke of the rack (shown in dotted lines in Fig. 6), the active wrist 205 rides off or frees itself from the driving toe to enable the adding machine parts to be returned to normal positions by the usual spring 9 connected to the main shaft by an arm 9ª. Said rack is guided in its reciprocatory motion by a stud 16 projecting through a slot in the rack.

A clutch mechanism or coupling connects the motor with the drive shaft. Said clutch in the present instance, comprises a notched or recessed clutch member, as a ratchet 229 (Fig. 7), preferably fixed to the hub 6 (Fig.
8) of the worm gear 224 by a mortise and tenon joint 228, to turn therewith. Obviously other means may be employed to effect the rotation of the ratchet in unison with the worm gear. The coöperating clutch member comprises a carrier or plate 233 (Figs. 1, 2 and 3) having an annular flange 231ª on one side, and fixed to the drive shaft 203 by a cotter pin 232 passing through said shaft and through the hub 231 on the opposite side of said carrier.

Pawls or dogs 241 pivotally secured at 240 to the inner arms of oppositely disposed elbow levers 236 pivoted by studs 235 to said carrier, connect the latter with the ratchet. Said pawls are slidably mounted in guide seats in the annular flange 231$^a$ through which they project, their inner ends being shouldered, as shown in Fig. 3 to enter and firmly engage the recesses 230 in the clutch member 229. The periphery of clutch member 229 is preferably but slightly greater than the shaft on which it rotates, whereby to reduce the peripheral speed of the ratchet, it being of less diameter than the worm gear 224, the object being to tend to prevent the pawls from jumping one or more notches when first taking hold. Springs 239 (Figs. 2 and 3) tend to force said pawls into engagement with the recessed clutch member at all times, said springs being mounted on guide rods 238, each of which is pivotally connected at 237 to projections on the outer arms of the elbow levers 236. The opposite ends of said guide rods are slidably supported in guide studs 234 projecting laterally from one side of the carrier 233 and against which the adjacent ends of the springs bear.

Normally the clutch is held inactive by means of a detent 219, 220 (Figs. 1, 4 and 5). Said detent is mounted on a rock shaft 217 with its outer end 220 normally in the path of any of a plurality of preferably equidistant pawl-releasing arms 246. Said arms each have a pin and slot connection 242, 245 with the outer arms of the elbow levers 236, and project from a ring 8 common to all the arms 246, said ring being loosely mounted, preferably, on the annular flange 231$^a$. The arrest of one pawl-releasing arm, therefore, will arrest all the arms to effect the simultaneous withdrawal of the pawls from the recesses. This engagement of the detent and pawl-releasing arm occurs, preferably, at the time when the active wrist 205 (Fig. 6) has freed itself from the toe 206 of the driving rack 15, at which time there is no load on the clutch. The pawl-releasing arms may be slotted, as at 244, (Figs. 4 and 5) to accommodate the pivot studs 235 of the elbow levers and the throw of said pawl releaser may be arrested by said slots.

A pressure or speed-accelerating arm 247 (Figs. 1, 4 and 5) is pivoted at 250 to a stationary part of the case 201, its free end being held, as by a spring 248, against one of a plurality of cam surfaces 251 formed on the periphery of the carrier 233. Said free end may have a roller 253 thereon. As the drive shaft has completed a half rotation, and after the wrist has released the rack, the free end of the pressure arm, which has ridden along the cam surface 251 (thereby increasing the tension of its spring), passes over the high point 251$^a$ of the cam onto an incline 249. The spring 248 presses the arm 247 firmly against said inclined face 249 to advance the cam and the clutch pawls 241 carried thereby ahead of the ratchet, or in other words, the clutch pawls, which have been turned by the ratchet, are speeded ahead of said ratchet by the pressure of the arm 245 against the inclined face 249, to move the pawls away from the walls of the recesses pressing against them, to facilitate their withdrawal from the ratchet, by relieving the frictional clutching pressure of the ratchet on the pawls. This forward movement or lead of the carrier relatively to the drive member 229, first brings the outer ends 246 of the pawl-releasing arms, into contact with the detent, which arrests the arms and the continued lead thereafter, aided by the inertia of the carrier and its connected parts, advances the pivotal points 235 of the elbow levers 236, the outer ends of which are connected to the arms of the pawl releaser. The resulting action is similar to that which would take place if the carrier was held stationary and the pawl releaser turned backwardly. The elbow levers rock on their pivots against the tension of springs 239 to withdraw the pawls from engagement with the ratchet and thereby uncouple the clutch. When the pawls are again thrown in, and the clutch turns, the pressure arm 247 rides onto the next cam 251 to tension spring 248 until the high point of the cam is again brought to position under the arm.

Depressing a motor key or bar 208 (Fig. 6) trips the detent 219, 220 to enable the clutch to become effective. Such key is pivoted at 208$^a$ to the outer arms of bent levers 209 pivoted at 210. Said bar or key 208 is removably supported on stems 208$^b$ having angularly-extending lugs 208$^c$ apertured to receive stop pins 208$^d$ on the arms of levers 209, whereby when the bar 208 is removed, the stems are held against turning on pivots 208$^a$ and hanging down within the machine casing (not shown), in which position they would be inaccessible until the machine casing is removed. The stop pins are of less diameter than the apertures in the lugs 208$^c$ to enable the stems and key to accommodate themselves to the swing of the bent levers 209. A link 211 connects the opposite arms of the levers 209 so that they will move in parallelism, one of said levers being connected by a link 212 to a crank 213 on a rock shaft 214. A second crank 214$^a$ on said rock shaft is connected by a link 215 with an arm 216 on rock shaft 217 to which the detent 219 is secured, whereby to trip or disable said detent to free the pawl-releasing arm held thereby, when the motor key is depressed. A stop 256 (Figs. 1 and 4) may be provided to arrest the backward throw of the detent 219. When the pawl-releasing arm 243 is freed, the springs 239 rock the elbow levers 236 to thrust the pawls 241 into the recesses 230 of the ratchet 229, to effect the clutching action, and in so doing, turn the pawl releaser on the flange 231ª. During the disengagement of the pawls, the carrier and its flange turn relatively to the pawl releaser, as above stated, to withdraw the pawls, such operation, in effect, returning the pawl releaser to its original position.

The engagement of the pawls and ratchet may be attended by some concussion, to deaden or minimize the sound of which, the ratchet 229 is fitted snugly into the annular flange 231ª (Fig. 8) which latter completely surrounds and incloses the ratchet. Furthermore, the notches or recesses 230 in the periphery of said ratchet do not in the present instance extend to the sides thereof. Thus there is left an unbroken annular surface at each edge of the ratchet (see Fig. 7) which has a running fit against the inner periphery of the annular jaw. By this construction resonance chambers which would amplify the sound of impact of the pawls and ratchet are eliminated.

The detent 219 is automatically restored or interposed in the path of the pawl release arms 246 by means of the cams 251 which are oppositely disposed on the carrier 233. The nearest cam wipes against a tappet 221 (Fig. 5) on the shaft 217 to rock the latter and swing the detent or intercepter back into effective position to disconnect the motor from the adding machine, to enable the adding machine parts to be returned to normal position by the spring 9. The depression of the motor key 208 in freeing the pawl release arm swings said tappet inwardly toward the cam 251 (see Fig. 4), said cam having a recess or depression 252 which is brought opposite the tappet as the clutch is thrown out, to enable the detent to be thrown backwardly sufficiently to free the pawl releaser arm. As soon as the clutch becomes effective, the cam is rotated to bring its operative surface 251 against the tappet and return the detent to effective position prior to the completion of a half rotation of the drive shaft. It will be seen that such cam action restores the detent even though the operator still attempts to hold the motor key depressed. Ordinarily the motor key is returned to idle position by a spring 218 (Fig. 6) connected to the side frame 10 and to one of the bent levers 209.

The equidistant pawl-releasing arms and cams together with the pawls, pawl levers and springs form a balanced, easily-running clutch. The clutch parts may be quickly applied to and removed from the shaft, and are readily manufactured, it being noted that the pawl mechanism is supported on a single carrier. Furthermore the cams on said carrier not only restore the detent to effective position, but are also acted upon by the pressure arm in releasing the pawls from their ratchet. It will be seen that though two sets of pawls, cams and pawl-releasing arms are shown, it is obvious that one or more sets may be used depending upon the number of times it is desired to release the clutch during one rotation of the drive shaft.

The worm gear 224 may be chambered (see Fig. 2) to contain a lubricant 225 which is fed to the worm through holes 226 in the periphery of the gear.

Briefly recapitulated, the operation of the invention is as follows: Assuming the parts to be in the positions shown in Fig. 1, the clutch being idle or in released position, and the motor 200 turning the worm shaft 4 and worm gear 223 which rotates the worm wheel 224 and ratchet 229 idly on the drive shaft 203, a depression of the starting key 208 (Fig. 6) rocks bell crank levers 209 against the tension of spring 218 to draw link 212 rearwardly and, through crank 213, rock shaft 214, crank 214ª, link 215 and crank 216, rocks shaft 217 to retract the detent 219, 220, and free the pawl releasing arm 243. Thereupon, the springs 239 (Fig. 3) expand to rock the levers 236 on their pivots 235 and thrust the pawls 241 into mesh with the teeth of the ratchet 229. The springs 239 also turn the ring 8 with its pawl releasing arms, on the flange 231ª, through the pawl levers whose outer arms have pin and slot connections 242, 245 with the pawl releasing arms. The pawls, when in mesh, connect the ratchet 229 with the carrier 233 fast on the drive shaft 203 to turn the latter and cause one of the wrists 205 (Fig. 6) to press against the toe 206 of the driving rack 15 and shift the latter to its dotted line position. The rack, during such travel, because of its engagement with the segment 12 on the main shaft 11, turns the latter forwardly, to cause the crank 2 on the shaft to traverse the slot in arm 3 and effect the operation of the registering mechanism (not shown). Also, the crank 13 on the main shaft is rocked to shift the link 14 connected thereto, and effect the operation of the printing mechanism, (not shown). Furthermore, the arm 9ª on the main shaft is rocked to tension the restoring spring 9. As the drive shaft 203 completes a half rotation, the active wrist or crank 205 rides off the toe 206 to permit the restoring spring 9 to rock the main shaft 11 in the reverse direction and return the machine parts to their normal idle positions. The main shaft 11, on its return stroke, turns the segment 12 to draw the rack upwardly, and such action may be assisted by the spring 207 (Fig. 6). During the rotation of the carrier 233, one of its cams 251 forces the pressure arm 247 outwardly (Fig. 5) to tension the spring 248, and the other of the cams 251 presses the tappet 221, 222 outwardly to rock detent 219, 220 back into the path of the projecting end 246 of pawl release arm 243, so that as the drive shaft 203 completes a half revolution, and after the machine load has been released, the spring-pressed arm 247 rides down the incline 249 on the carrier and forces the driven member of the clutch forwardly ahead of the drive member (the ratchet 229) to automatically relieve the pressure of the ratchet against the pawls 241, and bring the outer end 246 of the pawl-releasing arm against the detent 220, whereupon, both pawl-releasing arms are arrested. The driven member of the clutch (the carrier, its pawls and connected parts) continues to turn through a slight arc of movement, however, after the pawl releasing arms are arrested, which has the same effect as though the carrier was arrested, and the pawl releasing arms were shifted rearwardly. The slight further travel of the carrier advances the fulcrum points 235 and the outer arms of the pawl releasing levers, to accommodate such movement, slide in their pin and slot connections with the pawl releasing arms, so that the resultant effect is a rocking of the pawl levers against the tension of their springs 239 to withdraw the pawls from the ratchet and leave the parts in their idle positions shown in Figs. 1 and 6, in readiness for another operation.

What I claim as new, is—

1. In a clutch mechanism including driving and driven members, means to effect the disengagement of the members, and to automatically relieve the clutching action prior to the disengagement of the driving and driven members.

2. In a clutch mechanism, including driving and driven members, means to effect the disengagement of said members, and a speed-accelerating means to give the driven member a lead over the driving member to facilitate said disengagement.

3. In a clutch mechanism, the combination with a driven pawl-carrying member, a driving member, and means tending to engage the pawl with the driving member, of a detent to hold said pawl idle, and means to speed the driven member ahead of the driving member when the pawl is to be rendered inactive.

4. In a clutch mechanism including driving and driven members, one of which has a pawl to engage the other member, means to disengage said members and hold the clutch inactive including a pawl-releaser, means tending to drive the pawl-releaser in one direction to render the pawl effective, a detent to restrain said pawl-releaser against movement, and means to speed the pawl-carrying member ahead of the remaining member to free the pawl from the pressure of the driving member, when the members are to be disengaged.

5. In a clutch mechanism including coöperating clutch members, an intercepter or detent to normally hold the clutch idle, means to trip the intercepter to enable the clutch to become effective, means to restore the intercepter to active position, and a pressure arm engaging said restoring means to advance one of the clutch members ahead of the other to relieve the strain on the detent when the clutch is released.

6. The combination with driving and driven shafts, of clutch members to connect said shafts, a detent to normally hold the clutch idle, means to trip the detent to enable the clutch to become effective, a cam to return the detent to operative position, said cam having an inclined face, and a pressure arm coöperating with said inclined face to advance one of said clutch members ahead of the other to facilitate the disengagement of the members.

7. In a clutch mechanism, the combination with driving and driven members, of a pawl carried by one of the members, means tending to thrust the pawl into engagement with the other of said members, a lever to which the pawl is connected, a pawl-releasing member connected to the lever, a detent releasably engaging said pawl-releasing member to hold the pawl idle, and means to automatically restore the detent to effective position.

8. In a clutch, the combination with drive and driven members; and means to releasably connect said members; of a releaser connected with said means; a detent normally contacted by said releaser to maintain the clutch members disconnected; and means to operate upon the driven member to facilitate the disengagement of the clutch members by the releaser.

9. In a clutch mechanism, the combination with a ratchet member; of a co-acting member comprising a flange to encircle the ratchet, a pawl mounted for substantial radial movement through the wall of the flange; means tending to project the pawl into engagement with the ratchet; a pawl releaser connected to the pawl and turned by the pawl-projecting means; and a shiftable detent normally in the path of the releaser to restrain the effective action of the pawl.

10. In a clutch mechanism, the combination with a drive member; of a driven member comprising a carrier; a pawl mounted on the carrier; means tending to engage the pawl with the drive member; a pawl releaser mounted on the carrier to permit relative movement between the carrier and releaser, said releaser having a loose connection with the pawl; and a shiftable detent in the path of the releaser to maintain the pawl idle.

11. The combination with driving and driven shafts, of a clutch mechanism including a recessed member journaled on one of said shafts, a flange fast on said shaft and into which the recessed member is fitted, a pawl in said flange tending to engage the recessed member, a detent to hold the pawl normally idle, and means to displace the detent to enable the pawl to enter a recess in said member.

12. In a clutch mechanism, a recessed clutch member, a clutch pawl to coöperate therewith, a lever pivotally connected to the pawl, means tending to throw the dog into operative engagement with the recessed clutch member, releasing mechanism pivotally connected with the lever, an intercepter or detent to engage the releaser to hold the pawl normally idle, and means to displace the intercepter.

13. In a clutch mechanism, a recessed clutch member, a pawl to coöperate therewith, a lever pivotally connected to said pawl, a clutch release including a shiftable arm pivotally connected with said lever, means to turn the arm to render the pawl effective, and a detent removably interposed in the path of said arm to maintain the clutch idle by holding the arm against turning.

14. A balanced clutch mechanism comprising an annular, recessed clutch member, a coöperating clutch member including an annular flange arranged concentrically to the recessed clutch member, pawls seated at substantially equidistant points in said flange to engage the recessed clutch member, a pawl release including a rotatable ring having a swinging arm for each pawl, the arms being approximately equidistant, levers connecting the respective pawls and arms, a detent normally in the path of the arms to hold the pawls idle, means to trip the detent, and cams to restore the detent to effective position.

15. In a clutch mechanism, the combination with a recessed clutch member, of a coöperating clutch member including an annular flange, a plurality of pawls seated in said flange to engage the recessed clutch member, a carrier turning with the flange, bent levers on the carrier, one end of each lever being connected to its respective pawl, means tending to thrust the pawls into engagement with the recessed clutch member, a pawl-releaser journaled on the annular flange and having projecting arms, the remaining ends of the bent levers connected with said arms, and a detent removably interposed in the path of the adjacent pawl-releasing arm to hold the clutch idle.

16. In a clutch mechanism, the combination of coöperating clutch members; a spring-pressed pawl on one of said members adapted to engage the remaining member; pawl-releasing mechanism connected to the pawl; a detent normally contacted by the pawl-releasing mechanism to hold the pawl inactive; means to displace the detent; means operable by the clutch to restore the detent to effective position; and means to facilitate the disengagement of the pawl and coöperating clutch member by the pawl releasing mechanism.

17. In a clutch mechanism, the combination with clutch members; and means to releasably connect said members; of a releasing member operable upon said connecting means; a detent normally contacted by the releasing member to hold the connecting means idle; means to trip the detent; and means operated by the clutch to automatically restore the detent to effective position.

18. In a clutch mechanism, the combination with clutch members; and means to releasably connect said members; of a releasing member operable upon said connecting means; a detent normally contacted by the releasing member to hold the connecting means idle; means to trip the detent; and a cam on one of the clutch members to automatically restore the detent to effective position.

19. In a clutch mechanism, the combination with clutch members; and means to releasably connect said members; of a releasing member operable upon said connecting means; a detent normally contacted by the releasing member to hold the connecting means idle; means to trip the detent; a cam on one of the clutch members to automatically restore the detent to effective position; and means acted upon by and acting upon the cam to advance said clutch member to facilitate the disengagement of the connecting means.

20. In a clutch mechanism, the combination with drive and driven members; of a pawl carried by the driven member and normally tending to engage the drive member; a lever mounted on the driven member and having a pivotal connection with the pawl; an arm mounted to turn on and carried by the driven member, said arm having a pivotal connection with the lever; and a detent normally in the path of the arm to hold the pawl inactive.

21. In a clutch mechanism, the combination with drive and driven members; of a pawl carried by the driven member and normally tending to engage the drive member; a lever mounted on the driven member and having a pivotal connection with the pawl; an arm mounted to turn on and carried by the driven member, said arm having a pivotal connection with the lever; a detent normally in the path of the arm to hold the pawl inactive; means to trip the detent; and means to automatically restore the detent into the path of the arm.

22. In a clutch mechanism, the combination with drive and driven members; of a pawl carried by the driven member and normally tending to engage the drive member; a lever mounted on the driven member and having a pivotal connection with the pawl; an arm mounted to turn on and carried by the driven member, said arm having a pivotal connection with the lever; a detent normally in the path of the arm to hold the pawl inactive; means to trip the detent; and a cam on the driven member to automatically restore the detent into the path of the arm.

23. In a clutch mechanism, the combination with drive and driven members; a connecting means; releasing means for the connecting means; a detent with which the releasing means contacts to hold the connecting means idle; means to trip the detent; and means operable at a predetermined point on the driven member to impart a lead to the latter, over the drive member, and cause the releasing means to strike the detent.

24. In a clutch mechanism, the combination with drive and driven members; a connecting means; releasing means for the connecting means; a detent with which the releasing means contacts to hold the connecting means idle; means to trip the detent; and means rendered effective by and operable at a predetermined point on the driven member to impart a lead to the latter, over the drive member, and cause the releasing means to strike the detent.

25. The combination with drive and driven members, the latter having a releasable connection with a load; and means to connect said members; of means to automatically effect the disconnection of said members when the driven member has released its load.

26. In a clutch mechanism, the combination with drive and driven members; and means to connect the drive and driven members; of a releasing device operable upon the connecting means to hold it idle; a detent normally in the path of the releasing device to hold it effective; a resetting member connected with the detent; means to turn with the driven member to contact the resetting means and rock the detent into the path of the releasing device; the resetting member normally lying in idle position when the detent is effective; and means, including a touch bar, to trip the detent, and shift the resetting member into effective position.

27. In a clutch mechanism, the combination with drive and driven members; and means to connect said members; of a releasing device operable upon the connecting means to hold it idle; a detent normally in the path of the releasing device to hold it effective; and means to trip the detent, including a key bar; parallel motion levers on which the keybar is mounted; a trip shaft to operate the detent; and mechanism to connect the parallel motion levers and trip shaft; the trip shaft being adapted to operate the detent.

28. In a clutch mechanism, the combination with drive and driven members; and means to connect said members; of a releasing device operable upon the connecting means to hold it idle; a detent normally in the path of the releasing device to hold it effective; and means to trip the detent, including a keybar; parallel motion levers on which the keybar is mounted; a rock shaft operable by the parallel motion levers; and a trip shaft connected with the rock shaft, and effective to operate the detent.

29. In a clutch mechanism, the combination with drive and driven members; and means to connect said members; of a releasing device operable upon the connecting means to hold it idle; a detent normally in the path of the releasing device to hold it effective; and means to trip the detent, including a key bar; angular levers on which the key bar is mounted; means which connects the levers to cause them to rock in unison when the key bar is depressed; a trip shaft to operate the detent; and mechanism to connect the levers and trip shaft.

30. In a clutch mechanism, the combination with drive and driven members; and means to connect said members; of a releasing device operable upon the connecting means to hold it idle; a detent normally in the path of the releasing device to hold it effective; and means to trip the detent, including a key bar; parallel motion levers on which the key bar is mounted; a trip shaft to operate the detent; mechanism to connect the parallel motion levers and trip shaft; the trip shaft being adapted to operate the detent; and yielding means to restore the key bar to initial position.

HENRY KÜNTZLER.

In the presence of—
  HENRIK J. SCHMIDT,
  J. ARVID JANSSON.

Correction in Letters Patent No. 1,151,803.

It is hereby certified that in Letters Patent No. 1,151,803, granted August 31, 1915, upon the application of Henry Küntzler, of Wyoming, Pennsylvania, for an improvement in "Clutch Mechanism," an error appears in the printed specification requiring correction as follows: Page 2, line 74, for the reference-numeral "245" read *247;* and that the said Letters Patent should be read with this correction therein that the same may conform to the record of the case in the Patent Office.

Signed and sealed this 21st day of September, A. D., 1915.

[SEAL.]

J. T. NEWTON,
*Acting Commissioner of Patents.*